Feb. 19, 1929.
H. A. MYERS
1,702,743
CRANK PIN CONNECTION
Filed Nov. 12, 1927
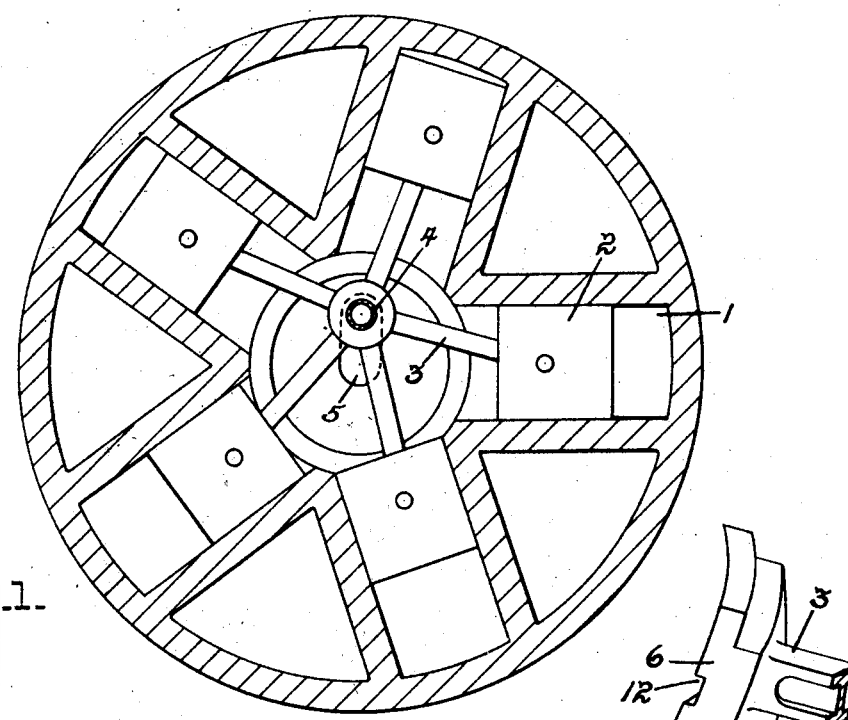
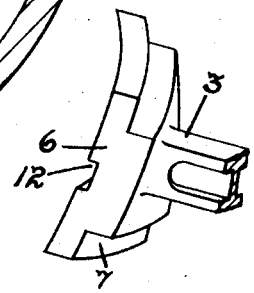
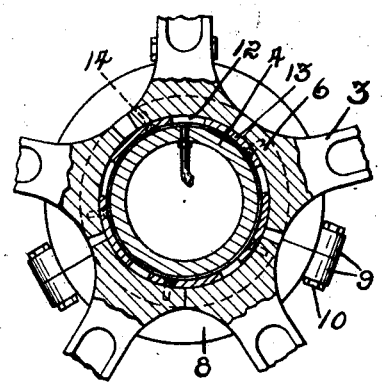
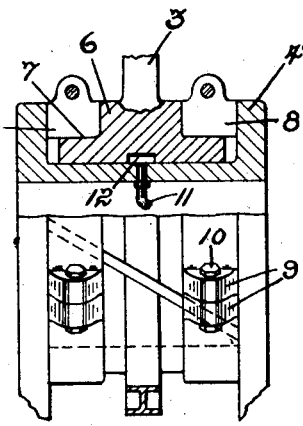
Inventor
Hubert A. Myers
By Owen & Owen
Attorneys Patented Feb. 19, 1929.

1,702,743

UNITED STATES PATENT OFFICE.

HUBERT A. MYERS, OF TOLEDO, OHIO, ASSIGNOR OF ONE-HALF TO ARTHUR S. HICKOK, OF TOLEDO, OHIO.

CRANK-PIN CONNECTION.

Application filed November 12, 1927. Serial No. 232,755.

This invention relates to connections between rods and crank shafts in which a plurality of rods are arranged radially of a shaft and connected to a common crank pin.

Objects of this invention are to provide a simple and efficient connection between a crank and a plurality of connecting rods so that equal pressure is exerted on the crank by each rod at each power stroke and all the force is delivered directly to the crank; to provide such connection with new and improved means, to effect an accurate adjustment of the parts, to take up wear and maintain proper assembly; and to provide a connection of the above character which is simple in construction, inexpensive to manufacture, easy to assemble, and has the new and improved features of construction and arrangement hereinafter described.

The invention is shown by way of illustration, but not of limitation, in the accompanying drawings, in which:

Fig. 1 is a vertical sectional elevation of a radial motor embodying this invention; Fig. 2 is an enlarged fragmentary sectional elevation of the connection between the connecting rods and crank shaft; Fig. 3 is a front elevation partly in section of the connection shown in Fig. 2; and Fig. 4 is a perspective view of a bearing member.

The illustrated embodiment of the invention comprises an engine having radially disposed cylinders 1 to receive pistons 2, each piston having pivotally connected thereto a connecting rod 3, which is connected at its lower end to a crank pin 4 of a crank shaft 5.

In accordance with this invention, there is formed on the end of each connecting rod 3 a bearing member 6, which is in engagement with the crank pin bearing. Flanges 4ª on opposite ends of the crank pin 4 provide a guide to receive the bearing members. Each bearing member 6 constitutes a section of a helix and is so formed that it assumes a diagonal position across the crank pin bearing with an end in advance of the other in the path of travel. It is apparent that the bearing members 6 are transversely inclined with respect to the crank pin axis so that liability of the parts becoming jammed is eliminated.

The bearing members 6 extend successively around the crank pin bearing 4, and sufficient space is provided to permit limited relative movement between the parts. As shown in Fig. 3, the bearing members 6 are co-extensive with the crank pin so that sidewise movement is prevented.

Each bearing member 6 is formed with grooves 7 at opposite ends thereof to receive clamping bands or retainers 8 which are, in this instance, constructed in three segments. Lugs 9 rising from the segments receive bolts 10 for securing the parts together. By thus providing three separate adjusting bolts, it is evident that a fine and accurate adjustment of the parts may be effected so that wear may be compensated for, and the elements maintained in bearing contact with the crank pin. The retainers 8 form with the crank pin guides to engage opposite end portions of the bearing members and hold these members in place, the ends of the bearing members being confined by the crank pin flanges 4ª.

An outstanding characteristic of this invention resides in the provision of bearing members, which in operation, contact in succession the same surface of the crank pin. It is to be noted that these members are equidistant from the ends of the crank pin, as well as from the axis thereof. No possibility exists for the bearing members to stick or become jammed due to their diagonal configuration which results in placing one end of each member in advance of the opposite end in the path of travel, and the advanced end of one member ahead of the rear end of the member in front of it. This also results in substantial bearing contact between the bearing elements and the crank pin.

A further important feature consists in that pressure exerted by the connecting rods is transmitted directly to the crank so that maximum power is imparted. It is obvious that equal pressure at all times is effected by each bearing member, and this is a cardinal improvement over other similar connections in which the pressure exerted by one connecting rod cannot be always equal to the pressure exerted by others.

In order to provide adequate lubrication for the bearing members 6, an oil tube 11 extends through the bore of the crank pin and terminates intermediate of the bearing surface thereof. It is apparent that unless provision is made to cover the gap between adjacent spaced bearing members, considerable oil flowing through the tube 11 would be wasted when the end of the tube is uncovered. To overcome this, each bearing member is formed with a transverse groove 12, and positioned therein is a relatively narrow arcuate segment 13 held in place by a pin 14, the respective segment occupying but a small portion of the groove and the remainder projecting from the bearing member into sliding engagement with a similar groove in the adjacent bearing member. The grooves 12 of the various bearing members are arranged to register with the end of the oil tube 11 so that waste of oil is eliminated, and satisfactory lubrication of the bearing is effected at all times.

It will be seen that I have provided a construction which satisfies the objects enumerated above and one which constitutes a valuable advance in the art. While I have shown the invention in a certain physical embodiment, it is to be understood that modifications of the structure shown may be made by those skilled in this art without departing from my invention as expressed in the following claims.

What I claim as new and desire to secure by Letters Patent is:

1. In combination, a crank pin having a bore, a plurality of piston rods radial of said crank pin, a bearing member for each piston rod arranged in radial succession around the crank pin, means to feed fluent lubricant to the bearing surface of said crank pin through said bore, and means on said bearing members to maintain the terminus of said feeding means covered thereby to prevent loss of lubricant.

2. In combination, a crank pin having a bore, a plurality of rods radial of said crank pin, longitudinally spaced annular guides on said crank pin, a bearing member for each rod having its ends disposed in said guides, means to supply fluent lubricant to the bearing surface of said crank pin through the bore thereof, and means including elements on said bearing members lapping adjacent bearing members for preventing loss of lubricant from said supply means.

3. In combination, a crank pin, a plurality of rods radial of said crank pin, longitudinally spaced annular guides on said crank pin, a bearing member for each rod, each bearing member having its front end in advance of the rear end of the bearing member ahead of it, each bearing member having a transverse groove, a segment disposed in each groove and projecting from the respective bearing member in sliding engagement with a groove in one of the adjacent bearing members.

In testimony whereof I have hereunto signed my name to this specification.

HUBERT A. MYERS.